United States Patent
Co et al.

(10) Patent No.: US 11,144,705 B2
(45) Date of Patent: Oct. 12, 2021

(54) COGNITIVE MULTIPLE-LEVEL HIGHLIGHT CONTRASTING FOR ENTITIES

(71) Applicant: International Business Machines Corporation, Armonk, NY (US)

(72) Inventors: Hau Co, Sharon (CA); Joseph Lam, Markham (CA)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 16/360,134

(22) Filed: Mar. 21, 2019

(65) Prior Publication Data

US 2020/0301999 A1     Sep. 24, 2020

(51) Int. Cl.
| | |
|---|---|
| *G06F 40/103* | (2020.01) |
| *G06F 40/205* | (2020.01) |
| *G06F 40/30* | (2020.01) |
| *G06K 9/20* | (2006.01) |
| *G06K 9/00* | (2006.01) |
| *G06F 40/289* | (2020.01) |

(52) U.S. Cl.
CPC .......... *G06F 40/103* (2020.01); *G06F 40/205* (2020.01); *G06F 40/289* (2020.01); *G06K 9/00456* (2013.01); *G06K 9/2054* (2013.01)

(58) Field of Classification Search
None
See application file for complete search history.

(56) References Cited

U.S. PATENT DOCUMENTS

| | | | |
|---|---|---|---|
| 7,219,307 B2 | 5/2007 | Senay | |
| 7,379,880 B1 | 5/2008 | Pathria | |
| 7,480,405 B2 | 1/2009 | Poynter | |
| 7,831,827 B2 | 11/2010 | Walmsley | |
| 8,347,237 B2* | 1/2013 | Bier | G06F 16/338 |
| | | | 715/853 |
| 8,917,275 B2 | 12/2014 | Grieves | |
| 9,397,844 B2 | 7/2016 | Howard | |
| 9,558,159 B1* | 1/2017 | Thirupparangiri | G06F 40/109 |
| 9,582,482 B1* | 2/2017 | Sharifi | G06F 40/134 |
| 2006/0156222 A1* | 7/2006 | Chi | G06F 40/169 |
| | | | 715/231 |
| 2007/0300190 A1* | 12/2007 | Bier | G06F 40/295 |
| | | | 715/862 |
| 2010/0169299 A1* | 7/2010 | Pollara | G06F 40/284 |
| | | | 707/708 |

(Continued)

OTHER PUBLICATIONS

Anonymous, "Accessible multi-category visible cross references," IP.com, Disclosure No. IPCOM000239036D, Oct. 12, 2014, 4 pages. <IP.com Disclosure Number: IPCOM000239036D>.

(Continued)

*Primary Examiner* — Ariel Mercado
(74) *Attorney, Agent, or Firm* — Peter K. Suchecki

(57) ABSTRACT

A computer identifies entity-containing content. The computer analyzes the entity-containing content for entities. The computer identifies a plurality of hierarchy levels for the entities. The computer receives selections of highlights for the entities, wherein the highlights for the entities within each hierarchy level share one or more characteristics. The computer applies entity contrasting. The computer outputs the entity-containing content with applied entity contrasting to a user.

20 Claims, 9 Drawing Sheets

(56) References Cited

U.S. PATENT DOCUMENTS

| | | | |
|---|---|---|---|
| 2014/0068756 A1 | 3/2014 | Dorfman | |
| 2014/0195884 A1* | 7/2014 | Castelli | G06F 40/295 |
| | | | 715/201 |
| 2017/0177180 A1* | 6/2017 | Bachmann | G06F 40/103 |
| 2017/0300565 A1* | 10/2017 | Calapodescu | G06F 16/353 |

OTHER PUBLICATIONS

"Color Safe—accessible web color combinations," Color Safe, printed Mar. 18, 2019, 1 page. <http://colorsafe.co/>.

"Create a Color Palette Accessibility Evaluator," NC State University IT Accessibility Resources, printed Mar. 18, 2019, 1 page. <https://accessibility.oit.ncsu.edu/tools/color-contrast/>.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

COGNITIVE MULTIPLE-LEVEL HIGHLIGHT CONTRASTING FOR ENTITIES

BACKGROUND

When reading or viewing a document, whether in a web page, software user interface, or in any other form, it can be helpful to highlight or otherwise mark one or more entities. When multiple entities are highlighted or marked, there can be issues with overlapping areas of highlighting and/or issues with colors or markings used for highlighting having insufficient contrast.

SUMMARY

Disclosed herein are embodiments of a method, system and computer program product for multiple-level highlight contrasting for entities. A computer identifies entity-containing content. The computer analyzes the entity-containing content for entities. The computer identifies a plurality of hierarchy levels for the entities. The computer receives selections of highlights for the entities, wherein the highlights for the entities within each hierarchy level share one or more characteristics. The computer applies entity contrasting. The computer outputs the entity-containing content with applied entity contrasting to a user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
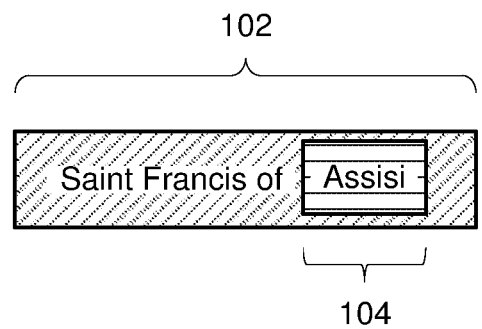
FIGS. 1A and 1B depict diagrams of example text entities with highlighting using multiple levels of contrast, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to multiple-level highlight contrasting for entities, and more specifically, to identifying and applying contrasting colors for multiple levels of highlighting areas of text. While the present disclosure is not necessarily limited to such applications, various aspects of the disclosure can be appreciated through a discussion of various examples using this context.

As used herein, "highlight," "highlighting," and variations thereof can refer to a variety of means of visually placing emphasis on or around an area of text or other entity. In some embodiments, highlighting can include surrounding an area of text with an area of color. For example, an area of text can be surrounded in yellow. In other embodiments, highlighting can include surrounding an area of text with an area of a pattern. For example, an area of text can be surrounded by an area of hatch marks, which may be useful when the display or a printout will be in black and white. Other possible forms of highlighting can include bolding, underlining, placing a circle, box, or other shape around the area of text, or otherwise marking an area of text for emphasis. In some embodiments, highlighting can include a border around text. A border could be in a pattern such as the areas of patterns above, and/or could be chosen from examples such as doubled-line, dotted, dashed, dotted-dash, hatches, diagonal-lines, etc., and references to patterns herein should be read to include border patterns as well as patterns of filled areas. Embodiments of the present disclosure may be discussed below with regard to one type of highlight, such as color, but should also be read to cover other forms of highlighting unless otherwise indicated.

When reading or viewing a document, whether in a web page, software user interface, digital signage, or in any other form, it can be helpful to highlight one or more entities, such as text entities. This can occur when performing a keyword search where terms used in performing the search are automatically highlighted to mark areas of a search document containing the term(s). This can also occur in a webpage where the user interface allows for selection of one or more references, keywords, or other options for highlighting. In other situations, areas of text can automatically be highlighted for emphasis or to indicate a passage is in reference to a particular source. This can occur using machine learning algorithms to mark citations to references to other documents, keywords of interest to a user or previous users, or for otherwise marking relevance of text to a particular purpose. Other entities which may be highlighted can exist and can include areas or lines of a chart, graph, figure, or image. When multiple entities are highlighted, there can be issues with overlapping areas of highlighting and/or issues with colors or markings used for highlighting having insufficient contrast. For example, if an area of blue highlighting is used to highlight the word "disease" in a webpage and an area of navy-blue is used to highlight the phrase "heart disease" in the same webpage, the result can have multiple issues which prevent a user from easily reading the text or identifying the distinction between the blue and navy-blue highlighting. This can be particularly true for those who are visually impaired, such as due to color blindness. As such, it may be advantageous for a system to provide for highlighting in contrasting colors or other contrasting markings which provides for multiple levels of highlighting.

Embodiments of the present disclosure provide for a method, system, and computer program product for multiple-level contrasting for text entities. A computer can identify entity-containing content for entity contrasting, where entities can include e.g., words or phrases. The computer can analyze the entity-containing content for entities to highlight. The computer can identify hierarchy levels of the entities. The computer can receive one or more font setting selections, which can influence choices of highlighting. The computer can receive selections of background colors or other highlighting for each of the entities. This can proceed by determining a quantity of entities within a hierarchy, receiving a selection of brightness (e.g., light or dark) of background colors, providing a plurality of background color options, receiving a selection of background colors, and repeating this process for each level of hierarchy. Once the selections of background colors or other highlighting for each of the entities are received, the computer can apply the entity contrasting and display the contrasted entity-containing content. In some embodiments, a user may provide adjustments to entity selections, such as de-selecting one or more keywords. In response, the computer can adjust the selections of background colors or other highlighting to accommodate the change.

Embodiments of the present disclosure provide advantages over existing technology. For example, using the method, system, or computer program product disclosed herein, a web developer may implement a user interface which enables a user to easily highlight multiple overlapping terms on a website, while doing so in a manner which is accessible to impaired users and allows for easy distinguishing of the terms involved. Embodiments of the present disclosure can help an organization comply with regulations relating to providing accessible content. Improving accessibility techniques can also increase the quality of a company's product and heighten brand perception. These improvements and/or advantages are a non-exhaustive list of example advantages. Embodiments of the present disclosure exist which can contain none, some, or all of the aforementioned advantages and/or improvements.

Figure 1B:
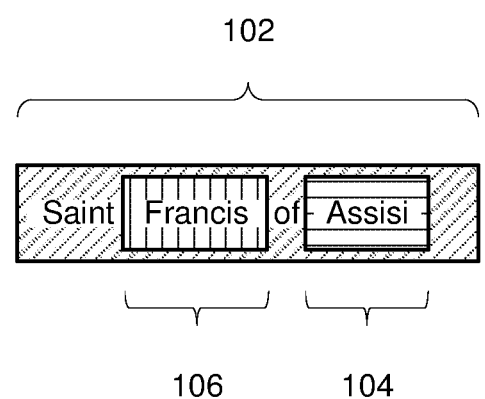

Referring now to FIGS. 1A and 1B, depicted are diagrams of example text entities with highlighting using multiple levels of contrast, in accordance with embodiments of the present disclosure. FIGS. 1A and 1B depict two versions of a simple example of text entities for simplicity, but more complicated overlapping text entities are contemplated by this disclosure and can be used in the method, system, and computer program product disclosed herein.

In the first example of FIG. 1A, shown is an entity 102 which comprises the phrase "Saint Francis of Assisi," which may be termed an entity pair because it includes another entity. Entity 102 is not contained within any other entities and it can be described as being part of the first or highest hierarchy level in an embodiment using nesting levels of hierarchies. Entity 102 can also be described with regard to the type of entity it is, which in this case could be "person." In some embodiments, a website, user interface, or other form of content containing text may include an option to highlight all entities of a particular type, such as "person." The entity 102 also contains within it an entity 104 of "Assisi," which can be termed an individual entity because it does not include another entity and the type of entity of entity 104 could be termed "place." As this entity 104 is within an entity at the first hierarchy level, but not within any other entities, it can be described as being part of the second hierarchy level, which in this example is the lowest hierarchy level (no entities are contained within entity 104). Other forms of hierarchies can be used in other embodiments, including hierarchies based on relative importance of text entities.

As depicted in this example, entity 102 has been highlighted with an area of diagonal markings of relative darkness due to the number of lines present. Entity 104 is highlighted with a contrasting form of highlighting, which is depicted as horizontal lines of a relative lightness due to the scarcity of lines. These markings of diagonal and horizontal lines are presented for example purposes only. Alternative highlighting, such as replacing (or supplementing) the diagonal markings with a color such as purple and the horizontal lines with a contrasting color such as yellow, can also be used. To further increase the contrast, the purple color could be a dark purple to match the dark horizontal lines and the yellow color could be a light yellow to match the light horizontal lines. Additional contrast could be provided by changing the font color of entity 102 to white if a dark purple highlight around the text is used. In addition or instead of either patterns or colors, borders around the text can be used. For example, a pattern of a border around entity 102 could be chosen from examples such as doubled-line, dotted, dashed, dotted-dash, hatches, diagonal-lines, etc. with a different border pattern for entity 104. Additional options include borders of varying thickness or otherwise distinct from one another.

In the second example of FIG. 1B, shown is an entity 102 which comprises the phrase "Saint Francis of Assisi," and which is substantially the same as in FIG. 1A. Inside of entity 102 are now two entities 106 and 104, where entity 106 is the word "Francis," which may be termed a "name" entity, and where entity 104 is the word "Assisi" and is substantially the same as in FIG. 1A. Like entity 104, entity 106 is an entity within an entity at the first hierarchy level, but not within any other entities, and can be described as being part of the second hierarchy level, which in this example is the lowest hierarchy level (no entities are contained within entity 106). Depicted in this second example, entities 102 and 104 are marked in the same highlighting as the first example. Additionally, entity 106 is highlighted in a contrasting form of highlighting compared to the entity it is contained within (entity 102), and the highlighting is depicted as vertical lines of a relative lightness. Continuing with the example colors from the first example, a light pink color could be used for the highlighting of entity 106 to contrast with the dark purple of entity 102 and be different from the light yellow of 104. Continuing with the example of borders from FIG. 1A, a third border pattern could be chosen for entity 106.

Figure 2A:
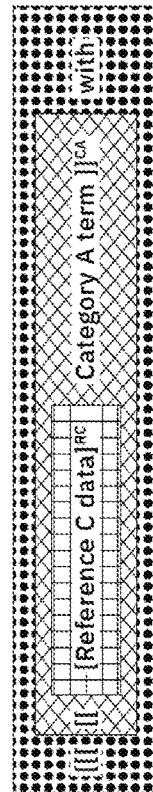
FIG. 2A depicts an area of text and a legend, each separated into entities to be highlighted using multiple levels of contrast, in accordance with embodiments of the present disclosure.
Figure 2A:
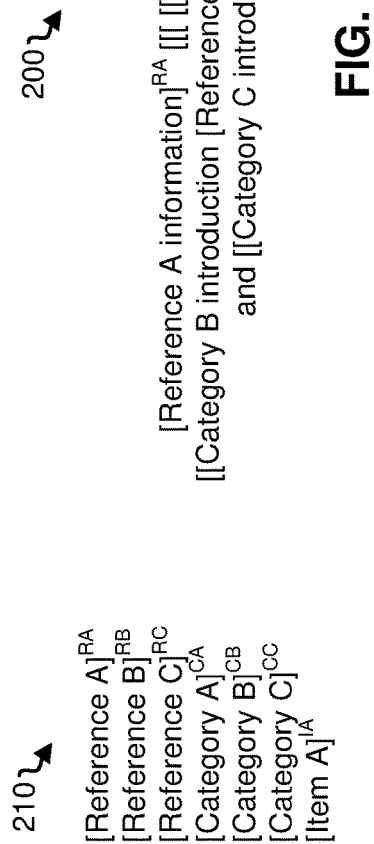

Referring now to FIG. 2A, depicted is an area of text 200 and a legend 210, each separated into entities to be highlighted using multiple levels of contrast, in accordance with embodiments of the present disclosure. The example text presented in FIG. 2A is provided for example purposes only. The text of area of text 200 used in FIG. 2A before separating into entities is: "Reference A information Reference C data Category A term with category B introduction Reference B data Category B content continuation and Category C introduction to Reference A specifics." While generic terms have been used here, the text of area of text 200 could refer to e.g., a scholarly publication referencing multiple sources of information (i.e., References A, B, and C), discussing concepts separated into multiple categories (i.e., Categories A, B, and C), and with some of the discussion involving an Item A. The numbers of references, categories, and items have been presented for example purposes only and any number of text entities including references, categories, items, or other groupings of text categories can be used in other embodiments.

In the example of FIG. 2A (as well as FIG. 2B below), a nesting hierarchy structure is not possible because the text entities "Reference A information" and "Reference A specifics" which are both to be highlighted as relating to Reference A would be at different levels of nesting (the former not nested within any other entities, and the latter nested within a Category C entity. An alternative form of hierarchy can be used in this embodiment where references (i.e., References A, B, and C) are at the highest hierarchy level, categories (i.e., Categories A, B, and C) are at a second hierarchy level, and Item A being at a third hierarchy level.

Area of text 200 includes brackets around the text entities presented, followed by a superscript shorthand label for each entity. For example, the first text entity "Reference A information" is surrounded by brackets and followed by a "$^{RA}$" to indicate it should be highlighted as referring to Reference A, as seen in legend 210. Because the text entity "Reference A information" relates to a reference, it is at the first or highest hierarchy level. Next, "Reference C data Category A term with category B introduction Reference B data Category B content continuation," is surrounded by three brackets followed by "$^{IA}$" indicating this text entity refers to Item A, as seen in legend 210. The text entity relating to Item A is at the third hierarchy level. Contained within this text entity are entities of first and second hierarchy levels relating to references and categories, respectively. For example, "Reference C data" (bracketed and followed by "$^{RC}$") is at the first hierarchy level and the Category A entity (bracketed and followed by "$^{CA}$"), is at the second hierarchy level for categories. Similarly, "Reference B data" (bracketed and followed by "$^{RB}$") is at the first hierarchy level because it is a reference entity. The Category B entity (bracketed and followed by "$^{CB}$"), which wraps around both sides of "Reference B data," is a second hierarchy level entity. A further second hierarchy level entity, "Category C introduction to Reference A specifics" is presented and includes a first level entity of "Reference A specifics." While three levels of hierarchy are shown in the example of FIG. 2A, this is for example purposes only and other numbers of levels of hierarchy may be used in embodiments.

Figure 2B:
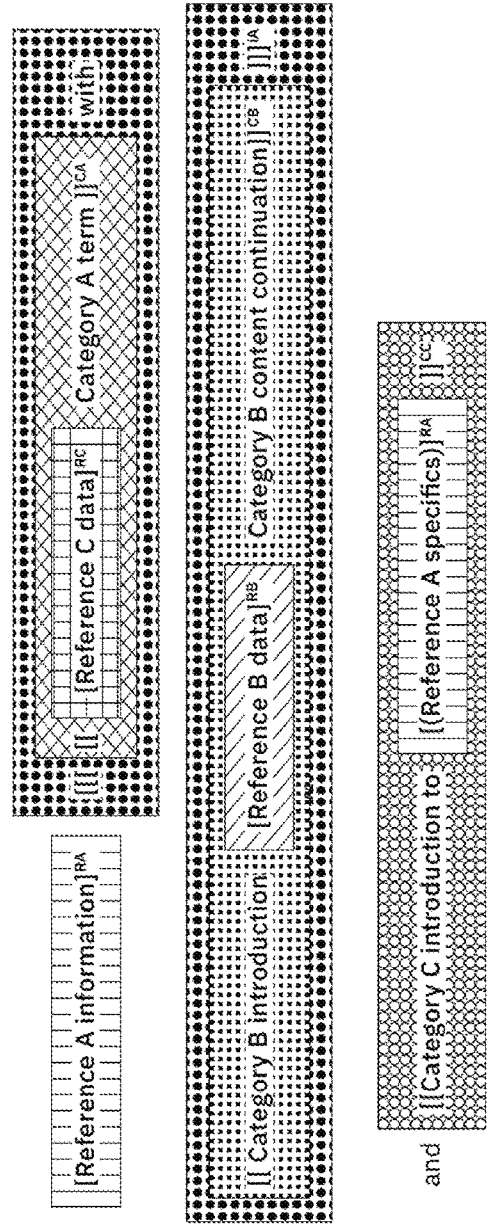
FIG. 2B depicts an area of text and legend with highlighting using multiple levels of contrast, in accordance with embodiments of the present disclosure.
Figure 2B:
Figure 2B:
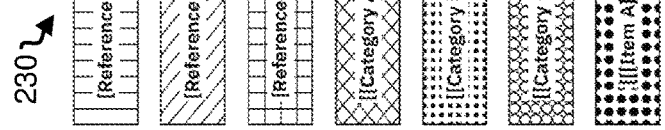

Referring now to FIG. 2B, depicted is an area of text 220 and legend 230 with highlighting using multiple levels of contrast, in accordance with embodiments of the present disclosure, in accordance with embodiments of the present disclosure. The example text of FIG. 2B is the same text presented in FIG. 2A: "Reference A information Reference C data Category A term with category B introduction Reference B data Category B content continuation and Category C introduction to Reference A specifics," and is shown with highlighting using multiple levels of contrast. Legend 230 presents a legend of the highlighting used for each of References A, B, and C, Categories A, B, and C, and Item A. Each of these references, categories, and item are highlighted using a different form of highlighting, which in the example of FIG. 2B is a pattern of lines, dots, or shapes. The highlighting used for text entities relating to the three references (References A, B, and C) are of a similar nature due to their being at the same hierarchy level. As depicted here, they are of relative lightness in amount of lines and with large spaces between them. The highlighting used for text entities relating to the three categories (Categories A, B, and C) are of a similar nature due to their being at the same hierarchy level. As depicted here, they are relatively darker and more complicated in amount of lines and with smaller spaces between the lines. Finally, the highlighting used for the text entities relating to Item A is even darker representing a third hierarchy level.

In other embodiments, the form of highlighting used may vary, including using different colors. For example, the vertical lines of Reference A could indicate a light pink color is used to highlight the text of Reference A. This highlighting of Reference A can be seen both in first text entity of area of text 220: "Reference A information" and later in the area of text for "Reference A specifics." Another light color, such as a light teal blue could be used to highlight the text of Reference B and correspond to the diagonal lines. Similarly, a light lavender color could be used regarding Reference C. Continuing with examples for the categories, Category A could be highlighted by a dark green, Category B could be highlighted by a dark red, and Category C could be highlighted by a dark navy-blue. In some embodiments, the thick dots of the third hierarchy (here corresponding to Item A) could return to a light color such as a light grey (establishing a light-dark-light hierarchy pattern), while in other embodiments, it could progress to a darker color such as a dark grey (establishing a light-darker-darkest hierarchy pattern). In embodiments using colors, both the shading of area of text 220 and the shading of the corresponding areas of legend 230 could be replaced by these colors. Additionally, the colors of the text itself could be varied for additional contrast. For example, in areas highlighted by the light pink, light teal blue, and light lavender, the text could be a black color to contrast with the light highlights. In areas highlighted by the dark green, dark red, and dark navy-blue, the text could be a white color to enhance readability and add further contrast. Depending on the shade of grey chosen for Item A, white (if a dark grey) or black (if a light grey) text could be used.

By using different colors, different symbols, and/or other different forms of highlighting, contrast can be achieved between each of the text entities. This includes contrast between adjacent entities, whether of the same or different hierarchy level, and between nested entities.

Figure 3:
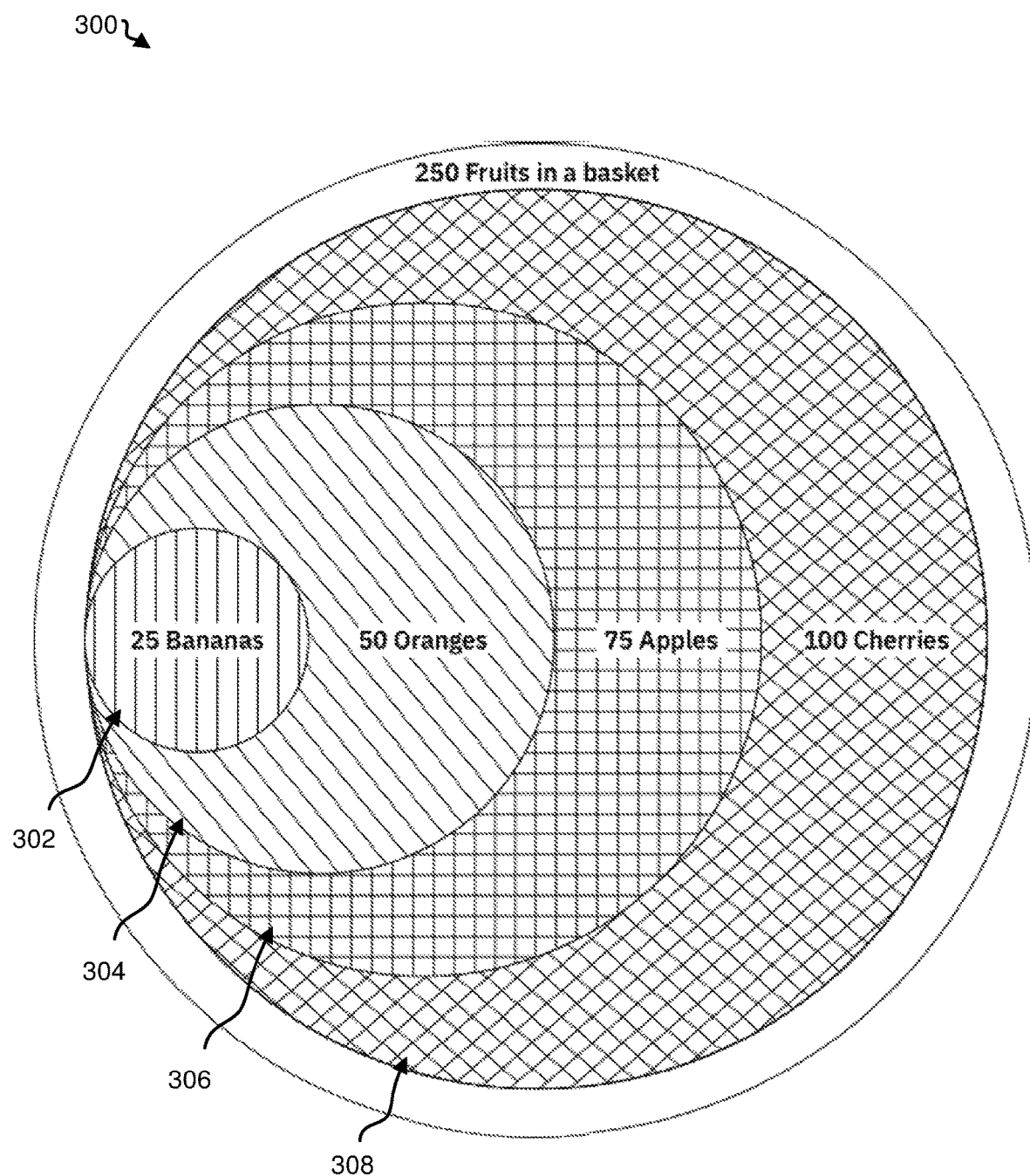
FIG. 3 depicts a chart with highlighting using multiple levels of contrast, in accordance with embodiments of the present disclosure.

Referring now to FIG. 3, depicted is a concentric pie chart 300 with highlighting using multiple levels of contrast, in accordance with embodiments of the present disclosure. FIG. 3 provides an example of a concentric pie chart 300 entitled "250 Fruits in a basket." Concentric pie chart 300 is composed of circular area 302 labeled "25 Bananas," circular area 304 labeled "50 Oranges," circular area 306 labeled "75 Apples," and circular area 308 labeled "100 cherries." In contrast to the text entities of FIGS. 1A, 1B, 2A, and 2B above, the entities depicted in FIG. 3 are areas of a chart.

As depicted in concentric pie chart 300, each of the circular areas 302, 304, 306, and 308 have been highlighted with a different and contrasting pattern. Circular area 302 has been highlighted with an area of vertical lines, circular area 304 has been highlighted with an area of diagonal lines, circular area 306 has been highlighted with a checkered area of both vertical and horizontal lines, and circular area 308 has been highlighted with a repeating diamond shape. These patterns are presented for example purposes only. Alternative highlighting, such as replacing (or supplementing) the patterns with colors, can also be used. In an embodiment of concentric pie chart 300 using colors, the "25 Bananas" circular area 302 could be highlighted in yellow, the "50 Oranges" circular area 304 could be highlighted in orange, the "75 Apples" circular area 306 could be highlighted in green, and the "100 cherries" circular area 308 could be highlighted in red.

The chart area entities depicted in concentric pie chart 300 can also be divided into levels of hierarchies. As depicted, there can be a single hierarchy level composed of 4 categories or items, with each of circular areas 302, 304, 306, and 308 being at the same hierarchy level. As shown, the four circular areas do not differ significantly in complexity or relative brightness. In an alternative embodiment (not depicted), concentric pie chart 300 could be divided into four hierarchy levels, with each of circular areas 302, 304, 306, and 308 being at a different hierarchy level. In such alternative embodiment, additional contrast could be added by alternating the level of brightness, level of complexity, or otherwise alternating an attribute of a pattern, color, border line attribute, or other type of highlighting to be used for circular areas 302, 304, 306, and 308. Continuing with the color example, the "25 Bananas" circular area 302 could be highlighted in light yellow, the "50 Oranges" circular area 304 could be highlighted in dark orange, the "75 Apples" circular area 306 could be highlighted in light green, and the "100 cherries" circular area 308 could be highlighted in dark red.

Figure 4:
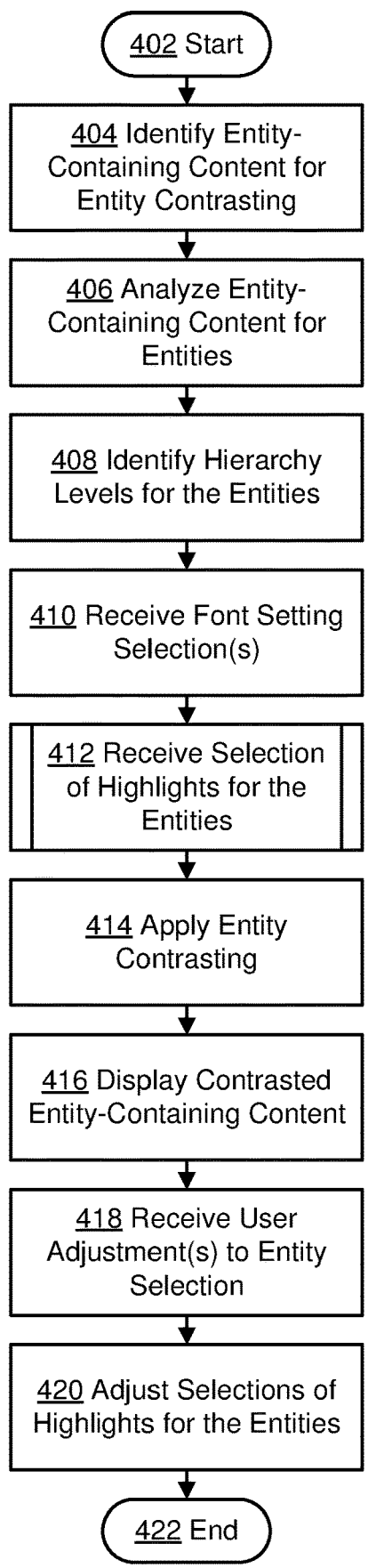
FIG. 4 depicts an example method for multiple-level contrasting for entities, in accordance with embodiments of the present disclosure.

Referring now to FIG. 4, depicted is an example method for multiple-level highlight contrasting for entities, in accordance with embodiments of the present disclosure. Method 400 can include more or fewer operations than those depicted. Method 400 can include operations in different orders than those depicted. Method 400 can be performed using a computer system such as computer system 700 of FIG. 7. In some embodiments, one or more portions of method 400 can be performed using cloud computing technology such as that described below with regard to FIGS. 7 and 8.

From start 402, method 400 proceeds to 404 to identify entity-containing content for entity contrasting. Identifying entity-containing content for entity contrasting can vary in embodiments and depend on the intended application of method 400. For example, if method 400 is being performed by a computer operated by a web developer, identifying entity-containing content for entity contrasting can entail identifying one or more websites for which entity contrasting is desired. In another example, method 400 may be performed by a web browser enhanced for accessibility, in which a user may select one or more websites for which entity contrasting is desired. In other embodiments, method 400 may be incorporated into a user interface element of an operating system and allow for selection of part or all of a user's display or the output of one or more programs operating on a computer for entity contrasting. In another embodiment, a user may be able to interact with digital signage and modify the display with entity contrasting. The entities of entity-containing content can vary in embodiments and include text entities, entities which are areas of a chart, graph, or image, or other types of entities for highlighting.

At 406, the entity-containing content is analyzed for entities. In some embodiments, this analysis can be performed using manual input, such as by a user entering one or more terms, sources, or other bases for identifying words or phrases for highlighting. For example, a user may wish to search a document, display, or webpage for the words "computer" and "computer processing unit" and input these selections into a user interface. Using a simple search for these terms can yield the entities in question. In a further embodiment of this example, a user may wish to highlight brand entities matching and may select or input a number of brand names for highlighting as "brands." In some embodiments, manual selection can involve checking boxes next to pre-selected text entities or other types of entities.

In other embodiments, this analysis may be automated. For example, in some embodiments using text entities, this may occur using natural language processing to identify keywords, parts of speech, or other aspects of language which a user may wish to have highlighted. In such embodiments, a user may be able to select or approve one or more automatically generated entities for use in method 400. This may be augmented using machine learning such that automatic selection of entities can be based in part on previous user selections or previous iterations of method 400 to improve the generation of entities.

At 408, method 400 identifies hierarchy levels for the entities. This may include a user grouping the entities determined at 406 into one or more hierarchy levels, such as the references, categories, and item of FIG. 2 above. In other embodiments, hierarchy levels may be determined on the basis of nesting, such as the example of FIG. 1. In some embodiments, one or more hierarchy levels may be suggested by an automated system, including on the basis of previous user selections.

At 410, method 400 receives font setting selections. In some embodiments, operation 410 can be optional. In embodiments where operation 410 is performed, a user may input one or more settings for the font of the text to be displayed. This can include the name of the font, the size of the font, one or more colors for the font, whether the font is to be underlined, italicized, or bolded, or any other font settings. In some embodiments, the selection of one of more font settings can impact the type of highlighting to be used, or alter recommended selections for highlighting. For example, if a user selects that the font be bolded, selective applying of bold as a form of highlighting will not be an available option for highlighting.

At 412, method 400 receives selections of highlights for the entities. This may involve multiple sub-steps and operation 412 is discussed in more detail in the sub-process flow of method 500 of FIG. 5. Operation 412 may be performed by a user inputting selections in response to prompts by a computer system. For example, a computer system may determine the number of categories of entities in a first hierarchy and prompt a user for a selection of whether the colors or other highlights used for these categories will be light or dark. In some embodiments, the highlights for the text or other entities within a hierarchy level may share this lightness or darkness as a common characteristic, and in other embodiments, a different common characteristic may be shared. In response, the computer system may present to the user a plurality of background color options or other forms of highlighting and a user may select a number of the provided options equal to the number of categories to use. This process may be repeated for each hierarchy until each category of entities in each hierarchy is assigned a highlighting color, pattern, border, or other highlighting option. In some embodiments, this may be performed by a web developer, site administrator, or other person with control over the entity-containing content identified at 404. In other embodiments, each user may be provided with these options and provide selections of colors, patterns, borders, or other highlighting options according to their desires. In still other embodiments, an automated process may determine selections of highlights for the entities without human input. In such embodiments, there may be a user option to change or otherwise modify the automatically selected highlights.

At 414, method 400 applies the entity contrasting. This can take the form of surrounding, filling, or otherwise applying to the entities the colors, patterns, borders, or other highlights selected at 412.

At 416, method 400 displays the contrasted entity-containing content as applied at 414. This can occur by displaying to a user the entity-containing content on a computer monitor, screen, or other display device.

At 418, method 400 can receive user adjustment(s) to the entity selection. A user may be able to modify the selection of entities from that determined at 406, such as by adding or removing one or more search terms which are highlighted, or de-selecting one or more references for highlighting. This may occur if a user is presented with a term which repeats with significant frequency they do not wish to see highlighted many times (for example, if a search included the word "the" and the text entity "the" was highlighted throughout a document). A user may input a modification to the entities to change which entities are to be highlighted. In some embodiments, this operation can be optional.

At 420, method 400 can adjust the selections of highlights in response to the user adjustments from operation 418. In some embodiments, this can be as simple as removing corresponding highlights. However, in other embodiments, removing one or more entities or categories of entities can lead to a different number of hierarchies or otherwise change the relative contrast between entities. In an embodiment where there are three hierarchies using light color highlights for the first hierarchy, dark color highlights for the second hierarchy, and light color highlights for the third hierarchy, a user selection that eliminates the second hierarchy may result in insufficient contrast between highlighted entities between the previous first and third hierarchies. In embodiments where a font color was changed to provide highlight, removal of an entity that was highlighted with a color around text may result in the text no longer being readable. These examples are provided for exemplary purposes and many other possible scenarios can occur where adjustment of the highlights used based upon a change in the entity selection at 418 may be necessary.

In some embodiments, adjusting the selections of highlights for the entities can entail returning to operation 412 to result in a new selection of highlights. In other embodiments, this can involve changing a darkness of colors, patterns, borders, or other highlights to accommodate the changed entity selection. After the selection of highlights for the entities, these highlights can be applied and displayed such as by returning to operations 414 and 416. After operation 420, method 400 ends at 422.

Figure 5:
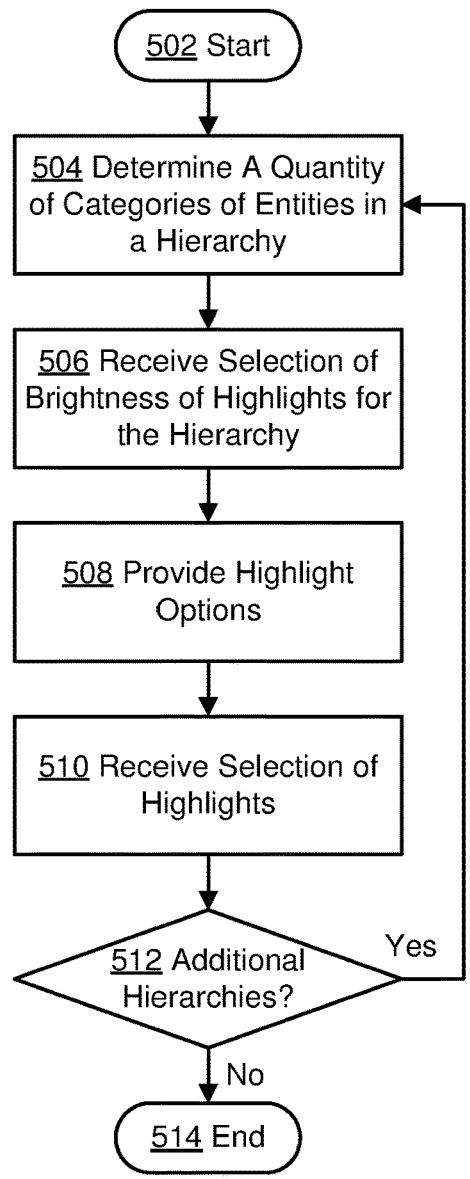
FIG. 5 depicts an example sub-process receiving selection of highlights for entities for multiple-level contrasting, in accordance with embodiments of the present disclosure.

FIG. 5 depicts an example sub-process receiving selection of highlights for entities for multiple-level contrasting, in accordance with embodiments of the present disclosure. Sub-process 500 can include more or fewer operations than those depicted. Sub-process 500 can include operations in different orders than those depicted. Sub-process 500 can be performed using a computer system such as computer system 700 of FIG. 7. In some embodiments, one or more portions of method 500 can be performed using cloud computing technology such as that described below with regard to FIGS. 7 and 8. Sub-process 500 can be a detailed version of operation 412 of method 400 of FIG. 4.

From start 502, sub-process 500 proceeds to 504 to determine a quantity of categories in a hierarchy. In some embodiments, operation 504 can be performed first, for a first or highest level hierarchy, or in other embodiments operation 504 can be performed for a lowest level hierarchy first. The quantity of categories can be determined by counting the number of categories of entities for the hierarchy level in question. In some embodiments, a user may be able to manually input the quantity of categories for a hierarchy. Using the example of FIG. 2, for the first hierarchy (references), operation 504 can determine that there are 3 categories of references (References A, B, and C).

At 506, sub-process 500 receives a selection of brightness of highlights for the hierarchy. Continuing with the example of FIG. 2, the highlights used for the references are of relative lightness in amount of lines and with large spaces between them. In the alternative example for FIG. 2 which used colors, the colors selected for the references were light colors (light pink, light teal blue, and light lavender). As such, in this example, the selection received at 506 of brightness of the highlights for the hierarchy would be "light." In some embodiments, this selection can be made by a user, such as by clicking on a "light" button in a user prompt instead of a "dark" button. In other embodiments, a system can automatically determine a selection of brightness of highlights for the hierarchy. This may particularly be true in successive iterations of operation 506. For example, if the selection of "light" brightness of highlights is chosen for the first hierarchy, the system may automatically select a "dark" brightness of highlights for the second hierarchy. This may continue in an alternating fashion in some embodiments. In some embodiments, different possible selections may exist than "light" and "dark," such as a choice of "pastel" colors, "cold" colors, "warm" colors, or similar groupings. For embodiments using patterns, alternative selections can exist such as "straight lines," "curved lines," "polygons," etc.

At 508, sub-process 500 provides highlight options. A computer performing sub-process 500 can store groups of highlight options which match the possible selections of brightness from 506 and present a plurality of highlight options to a user. In some embodiments, these options can be provided by displaying a word of sample text with the corresponding highlight around the text. For example, if a selection of "light" has been received at 506, a plurality of color options which are designated as "light" colors can be presented to a user including a light pink with a color hex code of #ffc2c2, light green with a color hex code of #ceffc2, light teal blue with a color hex code of #c2f5ff, and light lavender with a color hex code of #c2c2ff. In some embodiments, a computer can store a list of such colors including by storing hex codes or other list of highlight options and provide a number of options equal to or greater than the quantity of categories determined at 504, such that a user can select enough highlight options for each of the categories. In some embodiments, a user may be able to reject one or more provided options and the computer may provide further options from the list using an iterative approach.

In some embodiments, a list of colors or highlight options can be used for a particular entity-containing content based on the type of content involved. For example, a website for a wellness website may use colors which are primarily green, brown, and other earth tones as may be common in that industry. For another example, food industry websites may use bright colors such as orange, yellow, and red, which can have an appetite stimulating effect. In some embodiments, a system performing sub-process 500 can employ machine learning techniques to learn from user selections which color choices are selected together, most often, or least often. Such a system can prioritize and/or group color or other highlight choices in order to aid a user experience.

In some embodiments, color choices of a user may be saved for future use, such as where a user will use the same colors in future instances of method 400 and/or sub-process 500.

At 510, sub-process 500 can receive user selections of highlights from those provided at 508. This can include a user clicking on provided highlight options. In some embodiments, a user may have an option to allow a system performing sub-process 500 to automatically select highlight options for the user. This may occur based on the first options in a list or using machine learning techniques discussed above.

At 512, sub-process 500 checks whether additional hierarchies exist which have not yet been considered during sub-process 500. For example, after highlight options are provided and selected for a first hierarchy, sub-process 500 will check whether a second hierarchy exists. If so, sub-process 500 returns to operation 504 through 510 for the next hierarchy. Successive performances of operations 504 through 510 may depend on the previous performances. For example, there may be an automatic selection at 506 of a contrasting brightness level, or providing a recommendation of a contrasting brightness level for a second hierarchy compared to a first. At 508, provided highlight options may be chosen based on contrast to the highlight options selected at 510 for the first hierarchy level. For example, if shades of orange, yellow, and red were chosen previously, the provided highlight options can be based on color theory considerations such as complementary or split-complementary colors and provide shades of blue, green, and purple as options for the second hierarchy level.

Once there are no additional hierarchies at 512, sub-process 500 ends at 514.

Figure 6:
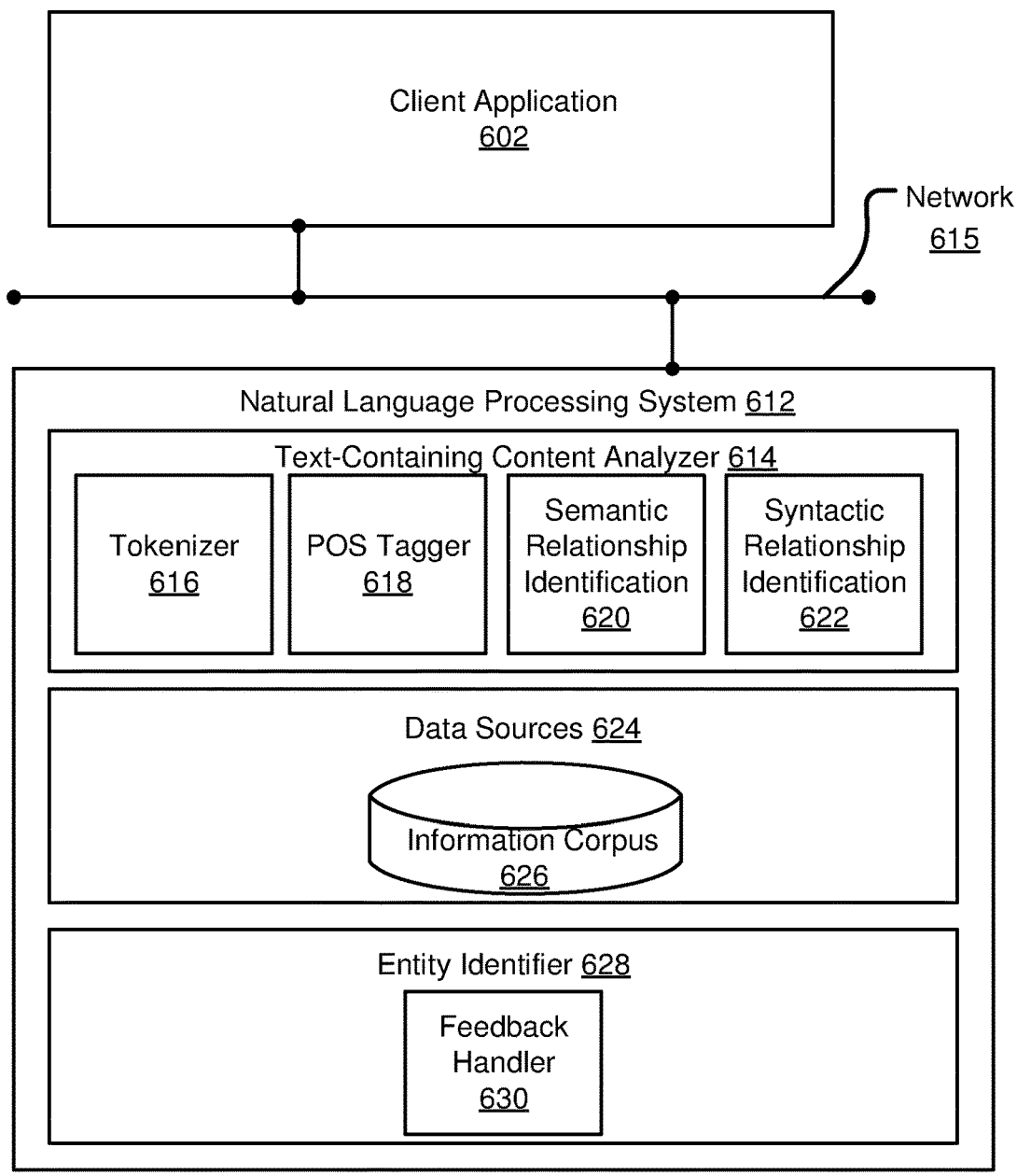
FIG. 6 depicts a natural language processing system, in accordance with embodiments of the present disclosure.

FIG. 6 depicts a natural language processing environment 600, in accordance with embodiments of the present disclosure. Aspects of FIG. 6 are directed toward an exemplary natural language processing environment 600, which can be used in performance of method 400, particularly with regard to operation 406 for analyzing entity-containing content for entities. Natural language processing environment 600 can be connected to a computer system which performs method 400, such as computer system 700 of FIG. 7 below, or can be remote from the computer system and be connected, e.g., by cloud technology. In certain embodiments, one or more users may send entity-containing content for analysis via a client application 602 to natural language processing system 612 using a remote device (such as computer system 700 of FIG. 7). Natural language processing system 612 can perform methods and techniques for responding to the requests sent by one or more client application 602. In certain embodiments, the information received at natural language processing system 612 may correspond to entity-containing content received from users, where the entity-containing content may be expressed in a free form and in natural language.

In certain embodiments, client application 602 and natural language processing system 612 can be communicatively coupled through network 615 (e.g. the Internet, intranet, or other public or private computer network). In certain embodiments, natural language processing system 612 and client application 602 may communicate by using Hypertext Transfer Protocol (HTTP) or Representational State Transfer (REST) calls. In certain embodiments, natural language processing system 612 may reside on a server node. Client application 602 may establish server-client communication with natural language processing system 612 or vice versa. In certain embodiments, the network 615 can be implemented within a cloud computing environment, or using one or more cloud computing services. Consistent with various embodiments, a cloud computing environment can include a network-based, distributed data processing system that provides one or more cloud computing services.

Consistent with various embodiments, natural language processing system 612 may respond to information sent by client application 602 (e.g., entity-containing content provided by users). Natural language processing system 612 can analyze the received entity-containing content. In certain embodiments, natural language processing system 612 may include an entity-containing content analyzer 614, data sources 624, and entity identifier 628. Entity-containing content analyzer 614 can be a computer module that analyzes the received entity-containing content. In certain embodiments, entity-containing content analyzer 614 can perform various methods and techniques for analyzing the entity-containing content syntactically and semantically. In certain embodiments, entity-containing content analyzer 614 can parse received entity-containing content. Entity-containing content analyzer 614 may include various modules to perform analyses of received entity-containing content. For example, computer modules that entity-containing content analyzer 614 may encompass include, but are not limited to, a tokenizer 616, part-of-speech (POS) tagger 618, semantic relationship identification 620, and syntactic relationship identification 622. In certain embodiments, the entity-containing content analyzer 614 can include using a natural language processing technique.

Consistent with various embodiments, tokenizer 616 may be a computer module that performs lexical analysis. Tokenizer 616 can convert a sequence of characters into a sequence of tokens. Tokens may be string of characters typed by a user and categorized as a meaningful symbol. Further, in certain embodiments, tokenizer 616 can identify word boundaries in an input question and break the question or any text into its component parts such as words, multi-word tokens, numbers, and punctuation marks. In certain embodiments, tokenizer 616 can receive a string of characters, identify the lexemes in the string, and categorize them into tokens.

Consistent with various embodiments, POS tagger 618 can be a computer module that marks up a word in a text to correspond to a particular part of speech. POS tagger 618 can read entity-containing content in natural language and assign a part of speech to each word or other token. POS tagger 618 can determine the part of speech to which a word corresponds based on the definition of the word and the context of the word. The context of a word may be based on its relationship with adjacent and related words in a phrase, sentence, question, or paragraph. In certain embodiments, context of a word may be dependent on previously provided entity-containing content. Examples of parts of speech that may be assigned to words include, but are not limited to, nouns, verbs, adjectives, adverbs, and the like. Examples of other part of speech categories that POS tagger 618 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In certain embodiments, POS tagger 618 can tag or otherwise annotate tokens of entity-containing content with part of speech categories. In certain embodiments, POS tagger 618 can tag tokens or words of entity-containing content to be parsed by natural language processing system 612.

Consistent with various embodiments, semantic relationship identification 620 may be a computer module that can identify semantic relationships of recognized identifiers in entity-containing content provided by users. For example, the semantic relationship identification 620 may include identifying recognized identifiers such as location, names, titles, bibliographic citations, brand names, ingredients, institutions, corporations, and other entities. In certain embodiments, semantic relationship identification 620 may determine functional dependencies between entities, the dimension associated to a member, and other semantic relationships.

Consistent with various embodiments, syntactic relationship identification 622 may be a computer module that can identify syntactic relationships in entity-containing content composed of tokens provided by users to natural language processing system 612. Syntactic relationship identification 622 can determine the grammatical structure of sentences, for example, which groups of words are associated as "phrases" and which word is the subject or object of a verb. In certain embodiments, syntactic relationship identification 622 can conform to a formal grammar.

In certain embodiments, entity-containing content analyzer 614 may be a computer module that can parse received entity-containing content and generate a corresponding data structure of the entity-containing content. For example, in response to receiving entity-containing content at natural language processing system 612, entity-containing content analyzer 614 can output the parsed entity-containing content as a data structure. In certain embodiments, the parsed entity-containing content may be represented in the form of a parse tree or other graph structure. To generate the parsed entity-containing content, entity-containing content analyzer 614 may trigger computer modules 616-622. Entity-containing content analyzer 614 can use functionality provided by computer modules 616-622 individually or in combination. Additionally, in certain embodiments, entity-containing content analyzer 614 may use external computer systems for dedicated tasks that are part of the entity-containing content parsing process.

Consistent with various embodiments, the output of entity-containing content analyzer 614 can be used by natural language processing system 612 to perform a search of one or more data sources 624 to identify entities included in the entity-containing content. In certain embodiments, data sources 624 may include data warehouses, information corpora, data models, and document repositories. In certain embodiments, the data source 624 can be an information corpus 626. The information corpus 626 can enable data storage and retrieval. In certain embodiments, the information corpus 626 may be a storage mechanism that houses a standardized, consistent, clean and integrated form of data. The data may be sourced from various operational systems. Data stored in the information corpus 626 may be structured in a way to specifically address reporting and analytic requirements. In one embodiment, the information corpus may be a relational database. In some example embodiments, data sources 624 may include one or more document repositories.

In certain embodiments, entity identifier 628 may be a computer module that generates a list of entities for the entity-containing content based upon the output of entity-containing content analyzer 614 and in conjunction with data sources 624. Consistent with various embodiments, entity identifier 628 may include a feedback handler 630.

In certain embodiments, feedback handler 630 can be a computer module that processes feedback from users on entities identified by entity identifier 628. In certain embodiments, users may be engaged in dialog with the natural language processing system 612 to evaluate the relevance of received entities. In certain embodiments, the feedback of users on these entities may be used for future natural language processing sessions.

The various components of the exemplary natural language processing system described above may be used to implement various aspects of the present disclosure. For example, the client application 602 could be used to receive entity-containing content. The entity-containing content analyzer 614 could, in certain embodiments, use a natural language processing technique to analyze entity-containing content, and identify keywords and word relationships in the content which indicate entities which should be highlighted using multiple level highlight contrasting. Further, the natural language processing system 612 could, in certain embodiments, compare the keywords to an information corpus 626 in determining which keywords are entities. The entity identifier 628 uses this information to create one or more lists and/or hierarchies of entities for highlighting.

Figure 7:
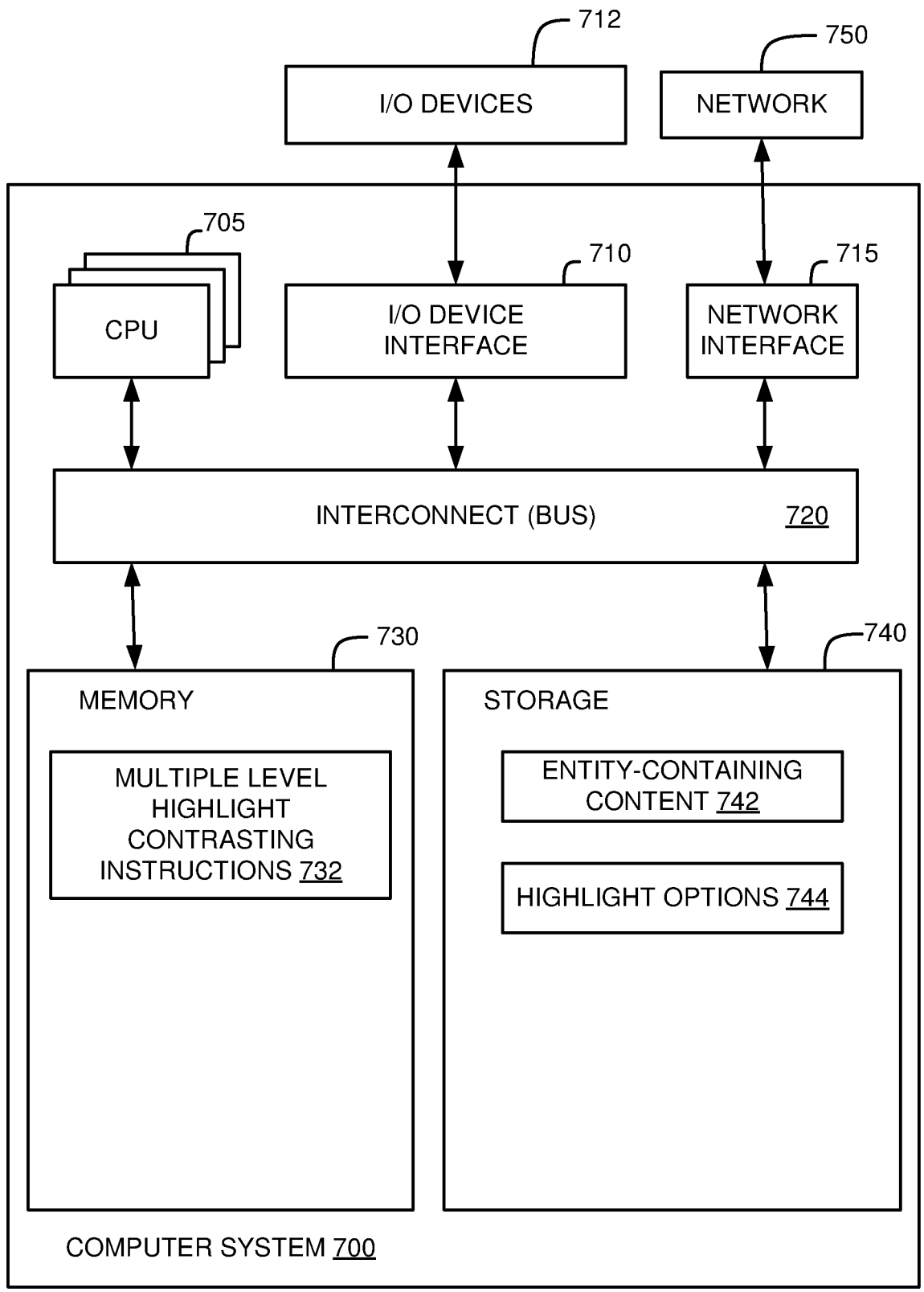
FIG. 7 illustrates a block diagram of a computer system, in accordance with some embodiments of the present disclosure.

Referring now to FIG. 7, illustrated is a block diagram of a computer system 700, in accordance with some embodiments of the present disclosure. In some embodiments, computer system 700 performs operations in accordance with FIG. 4 and/or FIG. 5 as described above. The computer system 700 can include one or more processors 705 (also referred to herein as CPUs 705), an I/O device interface 710 which can be coupled to one or more I/O devices 712, a network interface 715, an interconnect (e.g., BUS) 720, a memory 730, and a storage 740.

In some embodiments, each CPU 705 can retrieve and execute programming instructions stored in the memory 730 or storage 740. The interconnect 720 can be used to move data, such as programming instructions, between the CPUs 705, I/O device interface 710, network interface 715, memory 730, and storage 740. The interconnect 720 can be implemented using one or more busses. Memory 730 is generally included to be representative of a random access memory (e.g., static random access memory (SRAM), dynamic random access memory (DRAM), or Flash).

In some embodiments, the memory 730 can be in the form of modules (e.g., dual in-line memory modules). The storage 740 is generally included to be representative of a non-volatile memory, such as a hard disk drive, solid state device (SSD), removable memory cards, optical storage, or flash memory devices. In an alternative embodiment, the storage 740 can be replaced by storage area-network (SAN) devices, the cloud, or other devices connected to the computer system 700 via the I/O devices 712 or a network 750 via the network interface 715.

The CPUs 705 can be a single CPU, multiple CPUs, a single CPU having multiple processing cores, or multiple CPUs with one or more of them having multiple processing cores in various embodiments. In some embodiments, a processor 705 can be a digital signal processor (DSP). The CPUs 705 can additionally include one or more memory buffers or caches (not depicted) that provide temporary storage of instructions and data for the CPUs 705. The CPUs 705 can be comprised of one or more circuits configured to perform one or more methods consistent with embodiments of the present disclosure.

The memory 730 of computer system 700 includes multiple level highlight contrasting instructions 732. Multiple level highlight contrasting instructions 732 can be an application or compilation of computer instructions for performing method 400 of FIG. 4 and/or sub-process 500 of FIG. 5.

Storage 740 contains entity-containing content 742 and highlight options 744. Entity-containing content 742 can be content which contains text or other entities for highlighting by multiple level highlight contrasting instructions 732. It can take the form of a webpage, document, user interface, or other content which contains text or other entities for highlighting in accordance with the embodiments presented herein.

Highlight options 744 can be various types of highlights which can be used around text or other entities in order to bring attention to the entities and contrast it with surrounding entities. In some embodiments, highlight options 744 can contain a plurality of patterns including horizontal, vertical, and diagonal lines, shapes, or symbols which can be placed around, filled inside, or otherwise applied to entities. In other embodiments, highlight options 744 can contain a plurality of colors which can be applied to entities and may be separated into different levels of brightness, different categories such as pastel, warm, or cool, or otherwise organized.

In some embodiments as discussed above, the memory 730 stores multiple level highlight contrasting instructions 732, and the storage 740 stores entity-containing content 742 and highlight options 744. However, in various embodiments, each of the multiple level highlight contrasting instructions 732, entity-containing content 742, and highlight options 744 are stored partially in memory 730 and partially in storage 740, or they are stored entirely in memory 730 or entirely in storage 740, or they are accessed over a network 750 via the network interface 715.

In various embodiments, the I/O devices 712 can include an interface capable of presenting information and receiving input. For example, I/O devices 712 can receive input from a user and present information to a user and/or a device interacting with computer system 700.

The network 750 can connect (via a physical or wireless connection) the computer system 700 with other networks, and/or one or more devices that interact with the computer system.

Logic modules throughout the computer system 700—including but not limited to the memory 730, the CPUs 705, and the I/O device interface 710—can communicate failures and changes to one or more components to a hypervisor or operating system (not depicted). The hypervisor or the operating system can allocate the various resources available in the computer system 700 and track the location of data in memory 730 and of processes assigned to various CPUs 705. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
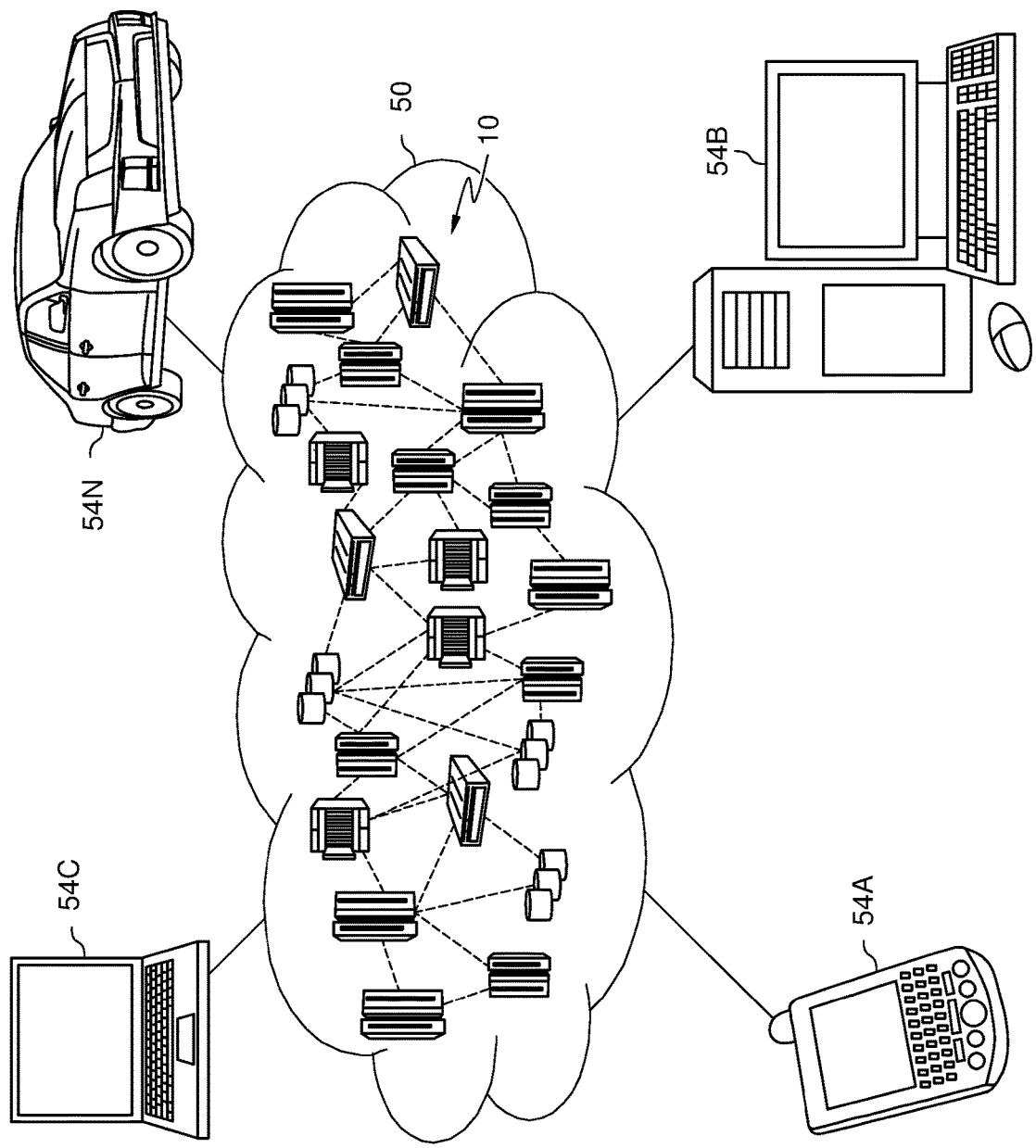
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
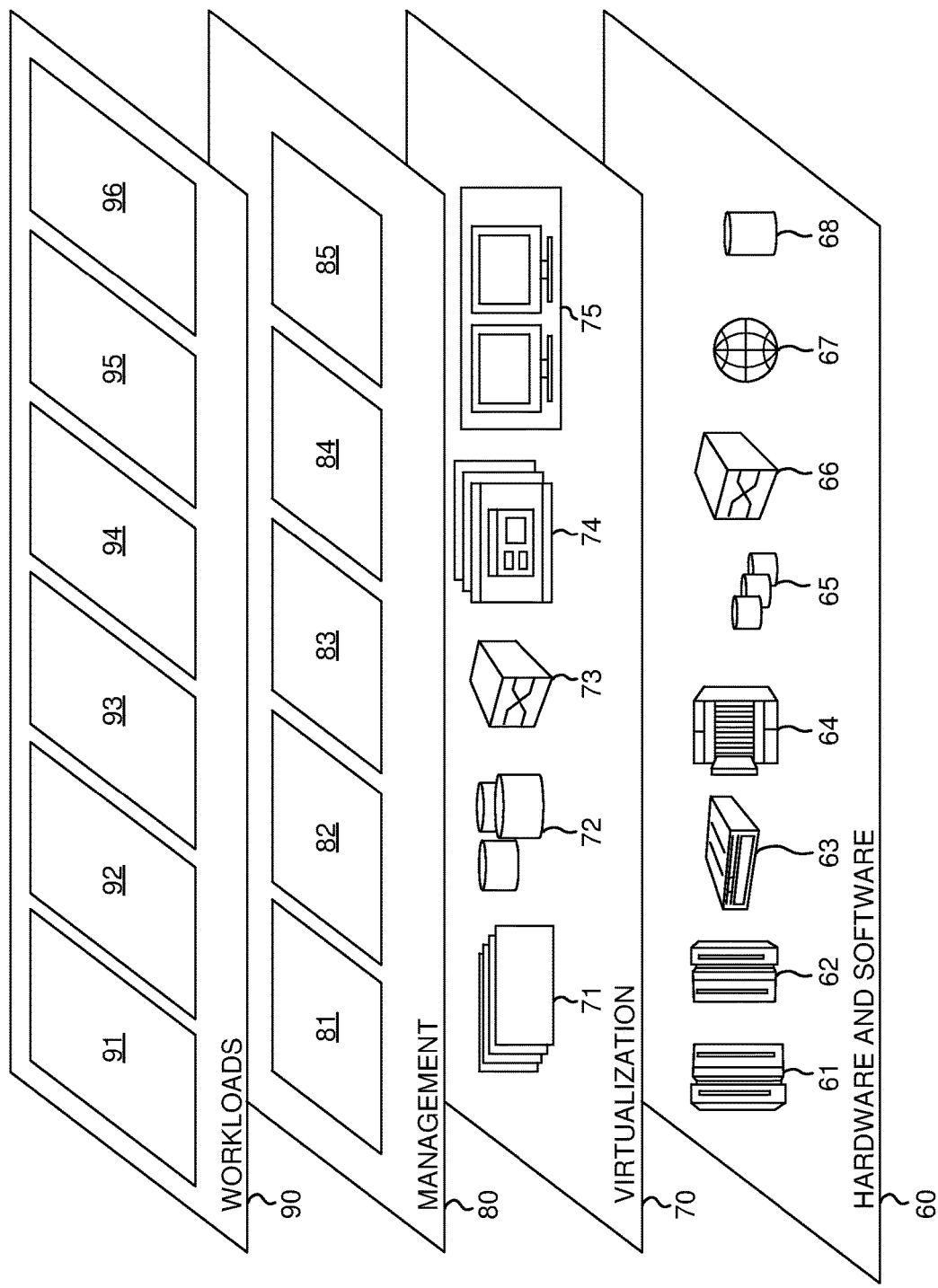
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multiple level highlight contrasting 96. Multiple level highlight contrasting 96 can be a workload or function such as that described in FIG. 4 above. In other embodiments, only a portion of the processing of multiple level highlight contrasting may be cloud based, such as a natural language processing system as depicted in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for multiple-level highlight contrasting for entities, the method comprising:
   identifying entity-containing content;
   analyzing the entity-containing content for entities;
   identifying a plurality of hierarchy levels for the entities, wherein a hierarchy of the plurality of hierarchy levels is based, at least in part, on a relative ranking of each entity within each respective hierarchy level of the plurality of hierarchy levels, wherein at least one rank of an entity is above one or more ranks of other entities of the entity-containing content;
   receiving selections of highlights for the entities, wherein the highlights for the entities within each hierarchy level share one or more characteristics;
   applying entity contrasting to the entities that were previously identified in the entity-containing content; and
   outputting the entity-containing content with applied entity contrasting to a user.

2. The method of claim 1, wherein relative positions of the hierarchy levels within the hierarchy are based on one or more selected from the group consisting of:
   a relative importance of the entities covered by each hierarchy level;
   whether an entity type in a particular hierarchy level is a subtype of an entity type in another hierarchy level of the plurality of hierarchy levels for the entities;
   a relative level of specificity of the entities covered by each hierarchy level; and
   user preference.

3. The method of claim 1, further comprising:
   receiving user adjustments to an entity selection; and
   adjusting the selections of highlights for the entities based upon the user adjustments.

4. The method of claim 1, wherein receiving selections of highlights for the entities further comprises:

determining a quantity of categories of the entities in each of the plurality of hierarchy levels;
receiving a selection of brightness of highlights for at least one of the plurality of hierarchy levels; and
providing a plurality of highlight options for at least one of the plurality of hierarchy levels.

5. The method of claim 1, wherein the highlights for the entities are colors which will surround the entities when applied, and wherein the selections of highlights for the entities of a first hierarchy level of the plurality of hierarchy levels are light colors and the selections of highlights for the entities of a second hierarchy level of the plurality of hierarchy levels are dark colors.

6. The method of claim 1, wherein the plurality of hierarchy levels for the entities are automatically determined based on previous user selections.

7. The method of claim 1, further comprising:
receiving a user selection that eliminates a first hierarchy level of the plurality of hierarchy levels; and
adjusting, in response to the first hierarchy level being eliminated, entity contrasting of each entity in a second hierarchy level.

8. The method of claim 1, wherein the highlights for the entities are based on a type of entity-containing content.

9. A system for multiple-level highlight contrasting for entities, the system comprising:
one or more processors; and
a memory communicatively coupled to the one or more processors,
wherein the memory comprises instructions which, when executed by the one or more processors, cause the one or more processors to perform a method comprising:
identifying entity-containing content;
analyzing the entity-containing content for entities;
identifying a plurality of hierarchy levels for the entities, wherein a hierarchy of the plurality of hierarchy levels is based, at least in part, on a relative ranking of each entity within each respective hierarchy level of the plurality of hierarchy levels, wherein at least one rank of an entity is above one or more ranks of other entities of the entity-containing content;
receiving selections of highlights for the entities, wherein the highlights for the entities within each hierarchy level share one or more characteristics but are not identical;
applying entity contrasting to the entities that were previously identified in the entity-containing content; and
outputting the entity-containing content with applied entity contrasting to a user.

10. The system of claim 9, wherein the instructions further cause the one or more processors to:
receive user adjustments to an entity selection; and
adjust the selections of highlights for the entities based upon the user adjustments.

11. The system of claim 9, wherein receiving selections of highlights for the entities further comprises:
determining a quantity of categories of the entities in each of the plurality of hierarchy levels;
receiving a selection of brightness of highlights for at least one of the plurality of hierarchy levels; and
providing a plurality of highlight options for at least one of the plurality of hierarchy levels.

12. The system of claim 9, wherein the highlights for the entities are colors which will surround the entities when applied, and wherein the selections of highlights for the entities of a first hierarchy level of the plurality of hierarchy levels are light colors and the selections of highlights for the entities of a second hierarchy level of the plurality of hierarchy levels are dark colors.

13. The system of claim 9, wherein the hierarchy levels associated with the entities are further organized based on one or more selected from the group consisting of:
a relative importance of the entities covered by each hierarchy level;
whether an entity type in a particular hierarchy level is a subtype of an entity type in another hierarchy level of the plurality of hierarchy levels for the entities;
a relative level of specificity of the entities covered by each hierarchy level; and
user preference.

14. A computer program product for multiple-level highlight contrasting for entities, the computer program product comprising a computer readable storage medium having program instructions embodied therewith, the program instructions executable by a computer to perform a method comprising:
analyzing a document to identify a plurality of entities in the document;
determining, for each identified entity, a hierarchy level from a plurality of hierarchy levels in the document, wherein a hierarchy of the plurality of hierarchy levels is based, at least in part, on a relative ranking of each identified entity within each respective hierarchy level of the plurality of hierarchy levels, wherein at least one rank of an entity is above one or more ranks of other entities of the plurality of entities;
applying highlighting to two or more entities of the plurality of entities, wherein a type of highlighting applied to each respective entity of the two or more entities is based, at least in part, on the hierarchy level of the respective entity; and
outputting the document with the applied highlighting.

15. The computer program product of claim 14, wherein the method further comprises:
receiving a selection of the two or more entities, wherein the selection indicates that the two or more entities are to be highlighted.

16. The computer program product of claim 14, wherein the types of highlighting applied to different entities that have the same hierarchy level share one or more characteristics.

17. The computer program product of claim 14, wherein the types of highlighting applied to different entities that have the same hierarchy level share one or more characteristics but are not identical.

18. The computer program product of claim 14, wherein the two or more entities includes a first entity having a first hierarchy level, wherein the first entity is a phrase that comprises a second entity and a third entity, the second and third entities having a second hierarchy level that is lower than the first hierarchy level, and wherein applying highlighting to the first entity comprises:
applying a first highlighting associated with the first hierarchy level to the first entity;
applying a second highlighting associated with the second hierarchy level to the second entity, wherein the second highlighting is applied such that the first highlighting is still visibly associated with the second entity; and
applying a third highlighting associated with the second hierarchy level to the third entity, wherein the third highlighting is applied such that the first highlighting is still visibly associated with the third entity.

19. The computer program product of claim 14, wherein each hierarchy level includes one or more groups of entities, wherein entities within each group of entities have at least one entity type in common, and wherein a relative position of a particular hierarchy level within the hierarchy is based on one or more selected from the group consisting of:
- a relative importance of the entities covered by each hierarchy level;
- a relative level of specificity of the entities covered by each hierarchy level; and
- whether an entity type at a respective hierarchy level is a subtype of an entity type at another hierarchy level of the plurality of hierarchy levels for the entities.

20. The computer program product of claim 14, wherein each hierarchy level includes one or more groups of entities, wherein entities within each group of entities have at least one entity type in common, and wherein determining the hierarchy level for each identified entity comprises:
- determining a first entity type for a first entity in the document;
- determining a first group of entities that includes the first entity type, wherein the first group of entities is within a first hierarchy level; and
- determining that the first entity is in the first hierarchy level.

\* \* \* \* \*